Patented Feb. 20, 1951

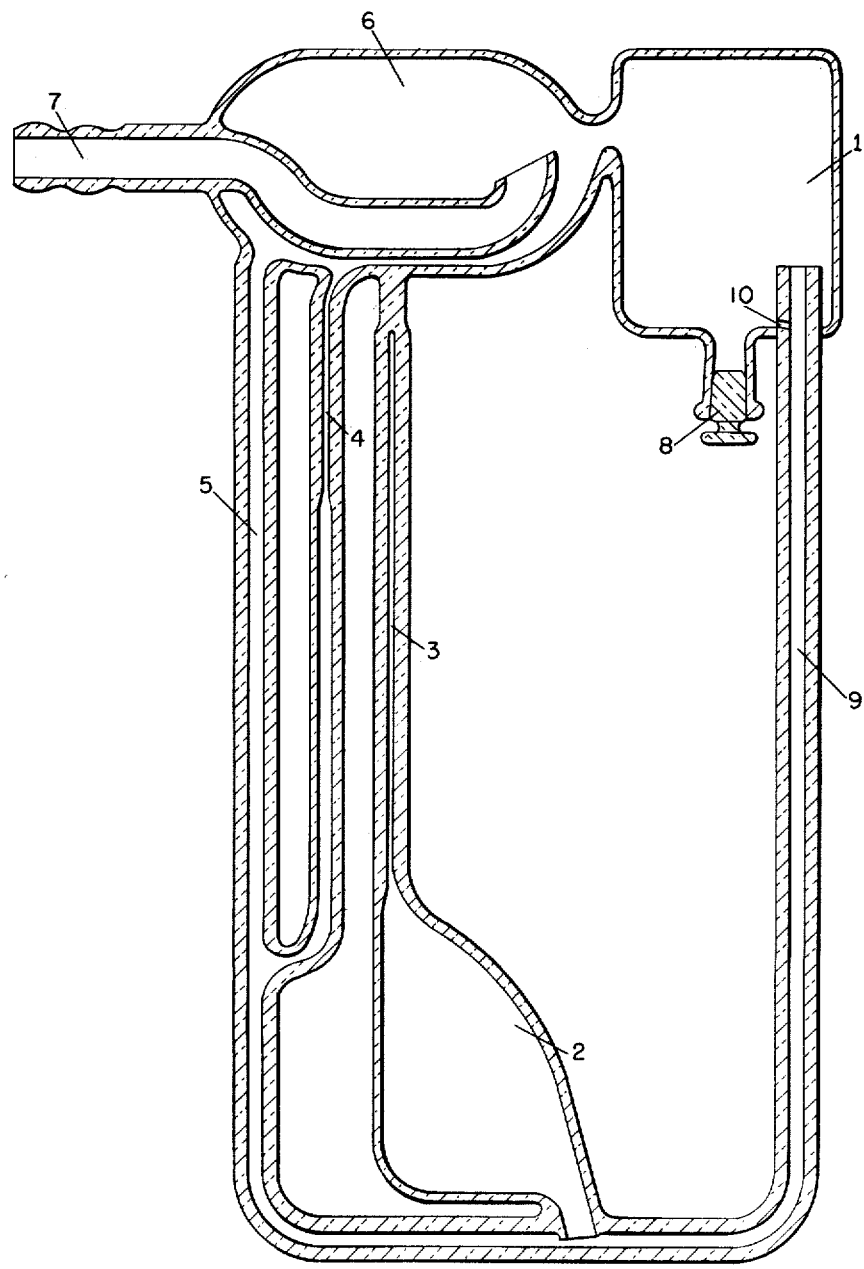
INVENTOR.
EARL W. FLOSDORF

2,542,076

UNITED STATES PATENT OFFICE 2,542,076

VACUUM GAUGE

Earl W. Flosdorf, Forest Grove, Pa., assignor to F. J. Stokes Machine Company, Philadelphia, Pa., a corporation of Pennsylvania Application May 17, 1949, Serial No. 93,699

1 Claim. (Cl. 73—400)

This invention relates to improvements in vacuum gauges of the type described in the Flosdorf and Coleman Patent 2,278,195, granted March 31, 1942.

The gauges described in Patent 2,278,195, which are McLeod type gauges pivotally mounted, have gone into wide use, in view of their simplicity, accuracy and convenience in use. However, with gauges adapted for measurements in the lower pressure ranges, for example, ranges from about 0.01 to 50 microns, it has been necessary to provide restrictions in the connection between the leveling bulb and the compression chamber to slow down the rate of flow of the mercury to avoid breaking of the mercury column as it flows into the measuring capillary tube. As a consequence, with gauges adapted for use in measuring pressures of this order of magnitude, it may require as much as two minutes to take a reading, and may require as much as two minutes to reset the gauge, because of this requirement for restriction of the rate of flow of the mercury.

The present invention provides improvements in gauges of this type which permit rapid readings to be made even in these low pressure ranges, without breaking the mercury column. With the improvements of the present invention, readings in the 0.01 to 50 micron range can be made in as little as five seconds and the gauge reset in about the same time.

In the improved forms of gauge of the present invention, provision is made for unrestricted flow of mercury from the leveling bulb to the compression chamber until the compression chamber is almost full of mercury, and for restricted flow of the mercury when the mercury is entering into or rising in the measuring capillary tube. In resetting the improved gauge after taking a reading the flow of mercury from the compression chamber and measuring capillary tube to the leveling bulb is unrestricted. As a result both the reading time and the resetting time are short, and comparable to the periods required for reading and resetting with gauges adapted to operate in higher pressure ranges, for example, from 5 to 5000 microns, where because of the larger size of the measuring capillary tube breaking of the mercury column is not encountered.

In principle, the present invention provides a by-pass arrangement by which, through the use of an unrestricted connection from the compression chamber to a point within the leveling bulb, and a restricted connection between the measuring chamber and a point within the leveling bulb at a lower level than the opening of the unrestricted connection, when the gauge is in a reading position, unrestricted flow is provided until the compression chamber is almost full and restricted flow is provided when the mercury is entering the neck of the measuring capillary and the measuring capillary itself.

One form of gauge which embodies the invention is illustrated in the attached drawing which is a cross-sectional view in front elevation with the gauge shown in the reading or vertical position. Except for the construction of the leveling bulb and the connecting tube, the gauge is the same as that described and illustrated in said Patent 2,278,195 and it is, therefore, unnecessary to describe the details of its construction. Mountings, connections to the vacuum space, the pressure of which is to be measured, etc., are not shown because these are the same as those described in Patent 2,278,195.

Thus the gauge illustrated includes a leveling bulb 1, a compression chamber 2, a measuring capillary tube 3, a comparison capillary tube 4, a by-pass tube 5, a trap chamber 6, a nipple 7 for connection to the vacuum space and for introducing mercury into the gauge, a plug 8 to facilitate emptying and cleaning the gauge and a connection 9 between the leveling bulb and the measuring chamber. In function and design, except for the arrangement of the leveling bulb and its connection to the connecting tube 9, the gauge is like that described in Patent 2,278,195.

The improvement provided by the present invention, embodied in the gauge illustrated, is the projection of the connecting tube 9 into the leveling bulb 1, together with the provision of the restricted opening 10, of smaller diameter than the inside diameter of the connecting tube 9, in the connecting tube 9 at the level of the inside surface of the leveling bulb 1. It is apparent that when the gauge is in the horizontal position, as described in Patent 2,278,195, and is then rotated to the vertical position for a reading, the mercury in the leveling bulb will flow through the connecting tube 9 to the measuring chamber 2. As long as the level of the mercury in the leveling bulb is above the projection of the connecting tube 9, flow will be through the unrestricted passageway and will be rapid. By having the projection of the connecting tube 9 into the leveling bulb of the proper length, this unrestricted flow will continue until the compression chamber is almost full of mercury. When the level of the mercury is at or below the top of the projection of the connecting tube 9, the mercury will flow only through the restricted opening 10 and hence will be sufficiently slow to avoid breaking the mercury column rising in the measuring capillary. On resetting the instrument, the flow of mercury from the compression chamber and the other portions of the gauge, such as the by-pass 5, comparison capillary 4, etc., will be unrestricted. It will thus be seen that the only time there is restricted slow flow of mercury is when the mercury is flowing from the leveling bulb into the compression chamber, measuring capillary, etc., after the compression chamber has been almost completely filled with the mercury by rapid flow through the unrestricted connecting tube 9.

Typical dimensions for a gauge designed for the pressure range 0.01 to 50 microns are as follows:

Capacity of compression chamber—725 grams of mercury at 18° C.

Inside diameter of capillaries—0.50 mm.
Length of measuring capillary—130 mm.
Inside diameter of connecting tube—3 mm.
Diameter of opening 10—0.75 mm.
Distance between top of opening 10 and end of connecting tube 9—12 mm.

Minor variations in dimensions are, of course, permissible. The construction must be such that when the gauge is in the reading position the mercury level in the leveling bulb is above the mercury level in the comparison capillary to take care of the capillary depression. By providing the comparison capillary, adjustment of the gauge to the proper position with respect to the scale provided on the support to take care of minor variations in the quantity of mercury introduced into the gauge is readily made.

In constructing a gauge of this type, it is advantageous to use frosted capillary tubing for the measuring and comparison capillaries, as such tubing helps to prevent breaking of the mercury column.

In the specific embodiment of the invention illustrated and described above, the restricted passageway or connection between the compression chamber and the leveling bulb has been provided by means of a small hole somewhat below the end of the connecting tube 9. A fully equivalent structure is one in which two connecting tubes between the leveling bulb and the compression chamber are provided, one with a relatively large lumen which projects somewhat into the leveling bulb to provide for the unrestricted flow and one of smaller diameter which either does not project into the leveling bulb or projects into it to a lesser extent to provide the restricted flow. Gauges so constructed are somewhat more expensive but equally useful.

I claim:

In a McLeod type vacuum gauge, adapted to contain mercury as a compressing agent, and having a leveling bulb, a compression chamber with attached measuring capillary tube, and an outlet for connection to a vacuum space, an unrestricted connection between the compression chamber and the leveling bulb projecting into the leveling bulb a short distance, and a restricted connection between the compression chamber and the leveling bulb opening into the leveling bulb at a lower level than said unrestricted connection when the gauge is in the reading position.

EARL W. FLOSDORF.

No references cited.